(12) United States Patent
Ellis

(10) Patent No.: US 12,036,082 B2
(45) Date of Patent: Jul. 16, 2024

(54) TOOTH REPAIR SYSTEM

(71) Applicant: Dentistry Elevated LLC, Wellsville, UT (US)

(72) Inventor: Jeremy Ellis, Wellsville, UT (US)

(73) Assignee: DENTAL INNOVATIONS, LLC, Wellsville, UT (US)

( * ) Notice: Subject to any disclaimer, the term of this patent is extended or adjusted under 35 U.S.C. 154(b) by 54 days.

(21) Appl. No.: 16/766,554

(22) PCT Filed: Nov. 6, 2018

(86) PCT No.: PCT/US2018/059496
§ 371 (c)(1),
(2) Date: May 22, 2020

(87) PCT Pub. No.: WO2020/096581
PCT Pub. Date: May 14, 2020

(65) Prior Publication Data
US 2020/0345454 A1    Nov. 5, 2020

(51) Int. Cl.
*A61C 5/35* (2017.01)
*A61C 13/15* (2006.01)

(52) U.S. Cl.
CPC .............. *A61C 5/35* (2017.02); *A61C 19/003* (2013.01)

(58) Field of Classification Search
CPC .......... A61C 5/35; A61C 19/003; A61C 13/30
See application file for complete search history.

(56) References Cited

U.S. PATENT DOCUMENTS

| 5,326,263 | A | | 7/1994 | Weissman et al. |
| 5,915,970 | A | * | 6/1999 | Sicurelli, Jr. .......... A61C 13/30 433/220 |
| 5,919,044 | A | * | 7/1999 | Sicurelli, Jr. .......... A61C 13/30 433/220 |

(Continued)

FOREIGN PATENT DOCUMENTS

| CN | 108472112 | * 11/2016 |
| EP | 3 090 701 | 11/2016 |
| JP | 2005/160865 | 6/2005 |

OTHER PUBLICATIONS

3M, Cementing Endodontic Post, 2006, entire document, esp p. 1, Fig. 3; p. 2, Fig. 1; p. 4, Fig. 4.

(Continued)

*Primary Examiner* — Jacqueline T Johanas
*Assistant Examiner* — Drew S Folgmann
(74) *Attorney, Agent, or Firm* — Preston P. Frischknecht; Project CIP

(57) ABSTRACT

This invention relates to a tooth repair system including a method of: drilling an aperture in, e.g., a broken anterior tooth to a predetermined depth; providing a fiber optic—preferably of a diameter of between 0.3 and 1 millimeter and elastic modulus of between 22 GPa and 83 GPa—with a length longer than the predetermined depth; placing and adhering the fiber optic within the first aperture so that a portion of the fiber optic is exposed beyond the broken tooth surface; and restoring the broken tooth surface around the exposed fiber optic so that the fiber optic anchors a restored tooth portion to the broken tooth surface. The system also provides a tooth repair pin with the above characteristics, being acid-etched and silane coated with a carrier sleeve.

9 Claims, 6 Drawing Sheets

(56) References Cited

U.S. PATENT DOCUMENTS

| | | | |
|---|---|---|---|
| 5,971,759 A * | 10/1999 | Richeda | A61C 13/1009 |
| | | | 433/220 |
| 6,371,763 B1 | 4/2002 | Sicurelli, Jr. et al. | |
| 2003/0148247 A1 | 8/2003 | Sicurelli, Jr. et al. | |
| 2003/0186197 A1 * | 10/2003 | Allred | A61C 5/50 |
| | | | 433/226 |

OTHER PUBLICATIONS

Ilumi, Introduction of Ilumi Fiber Optic Dental Post, 2015, entire document, esp p. 1; p. 3, table 1; p. 12; p. 13, In 10-11; p. 14, table 1.
Cecchin et al., Acid Etching and Surface Coating of Glass—Fiber Posts; Bond Strenth and Interface Analysis, 2016, entire document, esp. p. 1, para 2-para 3.
Stylianou et al., Light-Transmitting Fiber Optic Posts: an in Vitro-Evaluation, 2016, entire document.
Migliau et al., Evaluation of Over-Etching Technique in the Endodontically Treated Tooth Restoration, May 18, 2015, entire document.
Ilumi, Super Fiber Post/Glass Optical Fiber Post (Root Canal Post), 2013, entire document.

* cited by examiner

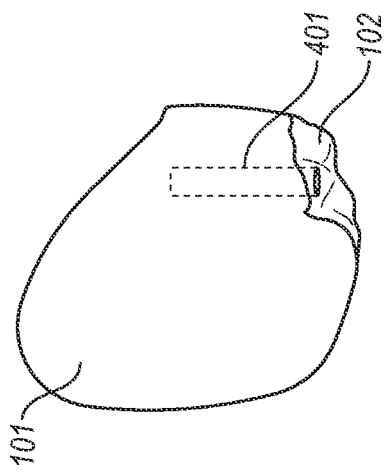
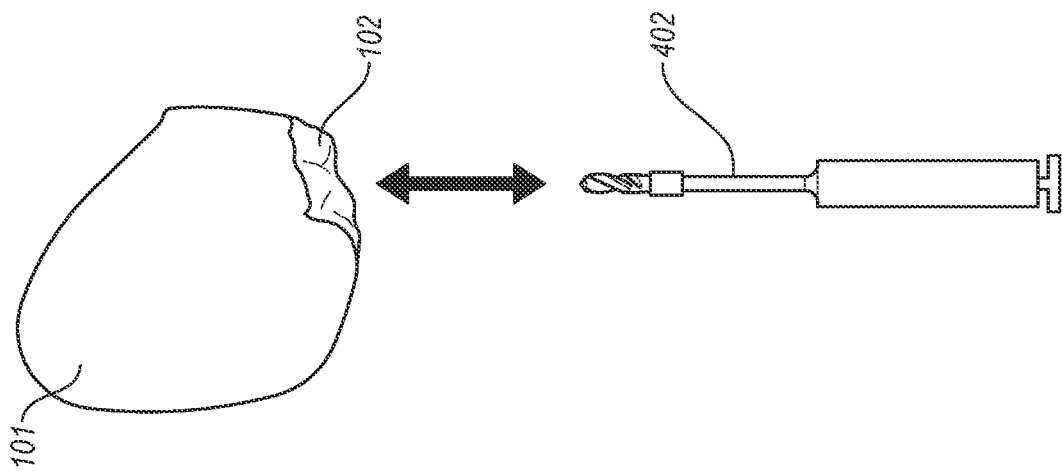

TOOTH REPAIR SYSTEM

TECHNICAL FIELD AND INDUSTRIAL APPLICABILITY OF THE INVENTION

This invention relates to a tooth repair system including a method of: drilling an aperture in the broken tooth to a predetermined depth; providing a fiber optic—preferably of a diameter of between 0.3 and 1 millimeter and elastic modulus of between 22 GPa and 83 GPa—with a length longer than the predetermined depth; placing and adhering the fiber optic within the aperture so that a portion of the fiber optic is exposed beyond the broken tooth surface; and restoring the broken tooth surface around the exposed fiber optic so that the fiber optic anchors a restored tooth portion to the broken tooth surface. The system may also include a tooth repair pin with the above specifications, further acid-etched and silane coated with a carrier sleeve.

BACKGROUND

Traumatic teeth injuries are often the most serious of dental emergencies. Unfortunately, these injuries are quite common. For example, surveys estimate that there are seven billion existing injuries to human anterior teeth. Repairs of anterior tooth injuries are notoriously temporary and faulty, requiring frequent patent follow-up visits and subsequent repairs. Moreover, existing treatments and approaches to these types of injuries have many serious drawbacks. Specifically, most anterior tooth repairs utilize some type of adhesive system. While adhesives have good compressional capabilities well suited for the generally compressional dynamics of posterior teeth, they have poor sheer capabilities, making them less suited for the incising, sheer force dynamics of anterior teeth. This problem is worsened by the fact that, in contrast to most posterior tooth injuries, anterior tooth injuries present far less surface area for bonding restorative material with adhesive.

In attempts to overcome these shortcomings, dental practitioners often rely on one or more supplemental procedures or steps. In one such example, a dental practitioner cuts grooves, divets, or other features in the injured tooth to create a type of mechanical lock between the tooth and restorative material, in addition to the chemical bonding provided by adhesive. See, e.g., Vaught, *Mechanical Versus Chemical Retention for Restoring Complex Restorations: What is the Evidence?*, Journal of Dental Education, 71 (10) 1356-1362 (2007). Other treatment possibilities include placing a veneer or crown. However, these approaches are expensive, aggressive, invasive, and result in the inordinate removal of useful, existing tooth structure which ultimately limits future treatment options in case further repair attempts are ever needed.

In another example, a self-tapping metal pin may be anchored into the existing tooth to act as a type of mechanical lock for restorative material and to supplement adhesive chemical bonding. While this approach avoids the unnecessary removal of existing tooth structure described above, it also has serious drawbacks. The inserted pin creates microfractures in the tooth enamel and dentin that weaken the tooth and may cause it to fail in the long term. See, e.g., Vaught; Segovic et al., *Changes in Dentin after Insertion of Self-threading Titanium Pins with 3 Methods*: A Scanning Electron Microscope Pilot Study, The Journal of Prosthetic Dentistry, Vol. 87, Issue 2 (2002). Moreover, because the metal pin is more rigid than tooth material, it unnaturally alters the directional force of the anterior tooth, introducing additional and damaging stresses. See, e.g., Zhang et al., *Review of Research on the Mechanical Properties of the Human Tooth*, International Journal of Oral Science, 6, 61-69 (2014). Furthermore, because anterior teeth are thin and somewhat translucent, the inserted pin tends to make the tooth appear gray and less aesthetically appealing or natural looking.

Given the seriousness and predominance of anterior tooth injuries, as well as the drawbacks of current repair approaches, a new solution is needed. A suitable solution would adopt a conservative treatment approach, preserve tooth structure as much as possible, generally maintain the natural directional forces and dynamics of the tooth, and be longer lasting than existing approaches.

SUMMARY

In accordance with the above, a new tooth repair system is provided. The system is long lasting and conservative in that it requires minimal removal of anterior tooth structure. The system also generally maintains the natural directional forces and dynamics of, for example, an anterior tooth, by utilizing a flexible and narrow diameter fiber optic pin with a Young's modulus that is comparable to that of the existing tooth material. The problems of providing a conservative and lasting repair, preserving tooth structure, and generally maintaining natural directional forces and dynamics in an injured tooth is therefore solved.

The system includes a method of: drilling an aperture in the broken tooth to a predetermined depth; providing a fiber optic—preferably of a diameter of between 0.3 and 1 millimeter and Young's modulus of between 22 GPa and 83 GPa—with a length longer than the predetermined depth; placing and adhering the fiber optic within the aperture so that a portion of the fiber optic is exposed beyond the broken tooth surface; and restoring the broken tooth surface around the exposed fiber optic so that the fiber optic anchors a restored tooth portion to the broken tooth surface. The system may also include a tooth repair pin with the above specifications and further being acid-etched and silane coated with a carrier sleeve.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical and/or exemplary embodiments of the invention and are therefore not to be considered limiting of its scope. The drawings may not be drawn to scale. The invention will be described and explained with additional specificity and detail through use of the accompanying drawings in which:

FIG. 4 is a front view of an injured anterior tooth showing an aperture drilling step in one embodiment of the system.

DETAILED DESCRIPTION OF EMBODIMENTS AND MODES FOR CARRYING OUT THE INVENTION

Figure 1:
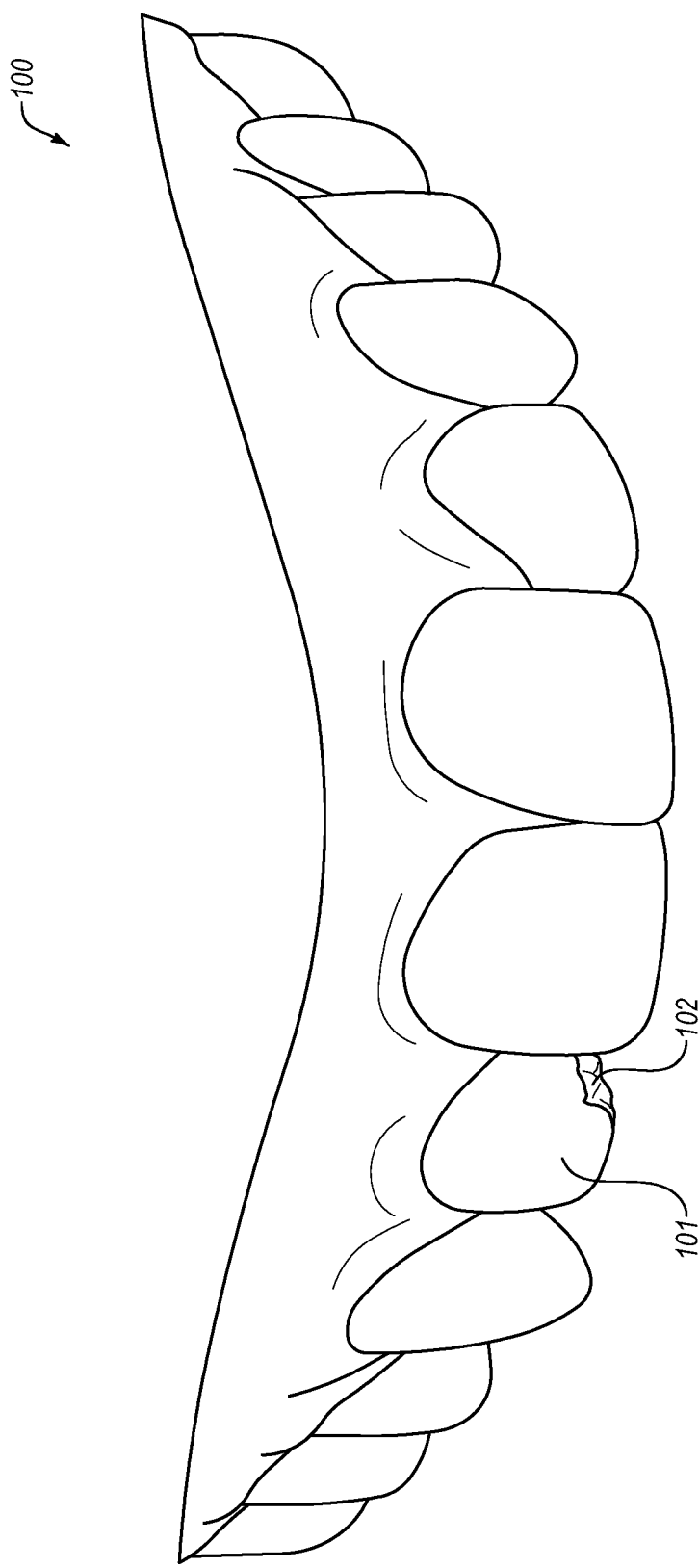
FIG. 1 is a front view of a set of teeth showing an anterior tooth injury.
Figure 2:
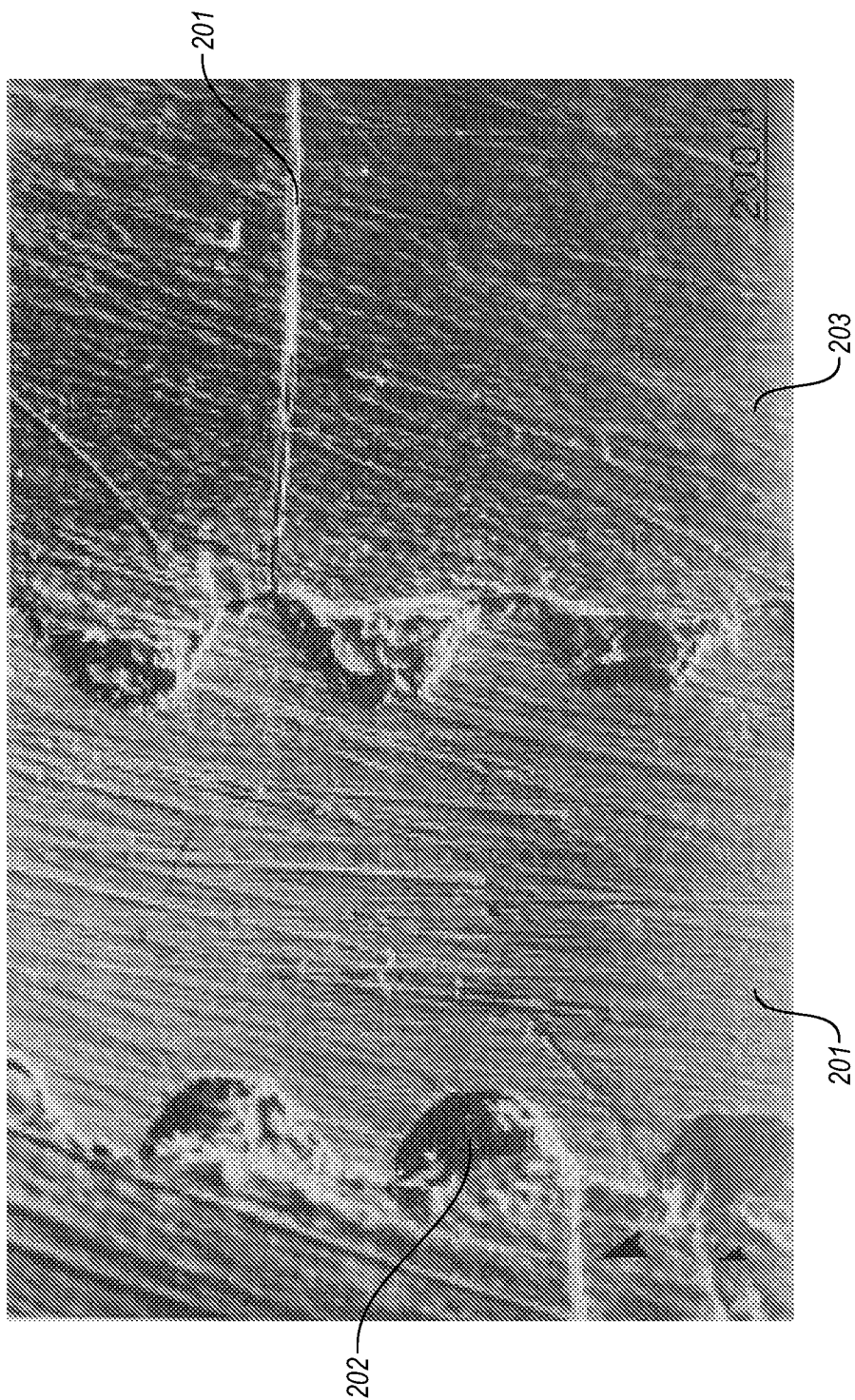
FIG. 2 is an electron microscopy photograph showing a side, cross sectional view of a prior art tooth repair approach wherein an inserted metal self-tapping pin has cracked the tooth.
Figure 3:
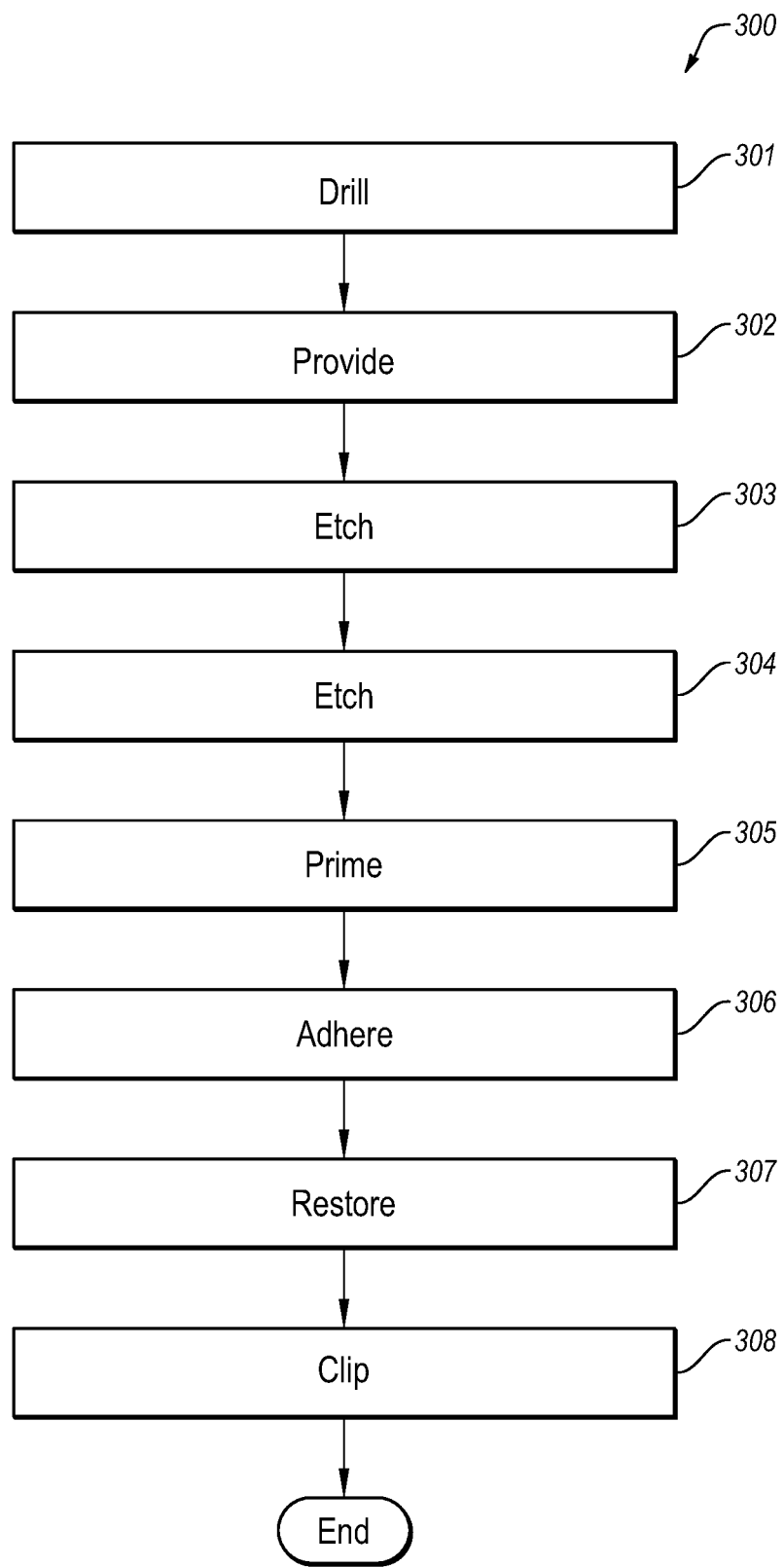
FIG. 3 is a block diagram showing method steps in one embodiment of the system.

The present invention in its various embodiments, some of which are depicted in the figures herein, is a tooth repair system. Without departing from the purposes and scope of the invention, in certain embodiments, the below-described system may also be used for anterior as well as posterior teeth, although, in preferred embodiments the system is optimized for repair of anterior teeth. Referring now to FIG. 1, an exemplary anterior tooth injury is shown. Specifically, within anterior tooth set 100, anterior tooth 101 depicts a typical incisal tip injury 102. Referring now to FIG. 2, one example of an existing or prior art repair approach to such an injury is shown, as well as one of its obvious drawbacks. FIG. 2 is an electron microscopy photograph showing a metal, self-tapping pin 201 placed within an aperture 202 of a tooth 203, where such placement and attempted repair has created a sizable microfracture 201 in the tooth 203, thereby increasing the likelihood of future failure.

Figure 6:
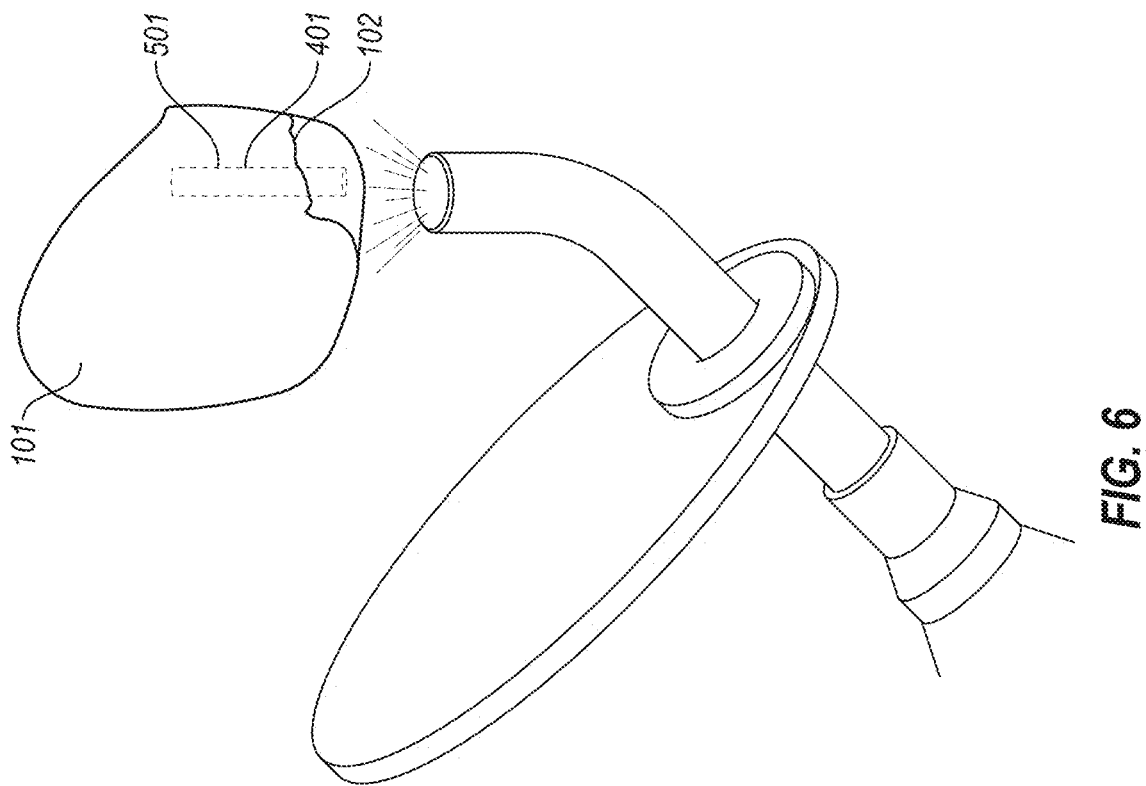
FIG. 6 is a front view of an injured anterior tooth showing restoring the broken tooth surface around the exposed fiber optic in one embodiment of the system.
Figure 5:
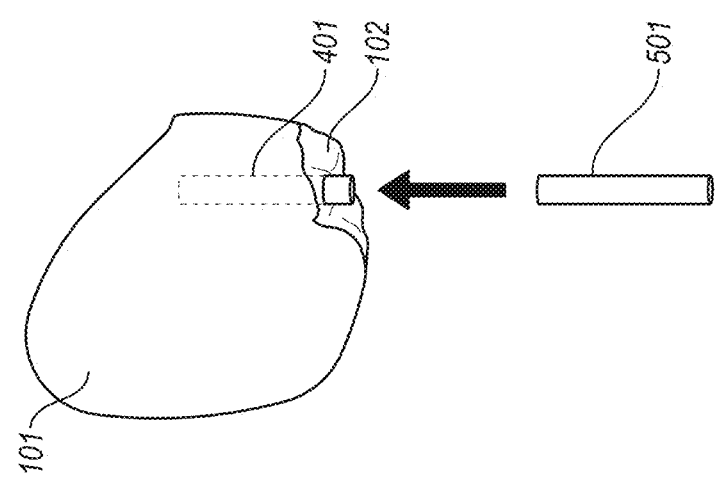
FIG. 5 is a front view of an injured anterior tooth showing a fiber optic placing and adhering step in one embodiment of the system.

Referring now to FIGS. 3-6, a method 300 of the improved system is set forth by block diagram (FIG. 3) and partial illustration of the steps (FIGS. 4-6). First, the dental practitioner drills 301 an aperture 401 to a predetermined depth in a broken tooth surface 102 along a generally longitudinal axis of the tooth 101. Although the dental practitioner may choose from a variety of drill bits 402 and/or drill bit diameter sizes in creating the aperture 401, one exemplary and preferably sized bit has a diameter of 2 millimeters and preset depth of 0.6 millimeters. The precise aperture depth and/or diameter will, of course, vary—without departing from the scope of the invention-based on the nature of the specific injury presented and the further requirements of the method described in further detail below. However, in preferred embodiments, the predetermined depth is located within one or more of tooth enamel and dentin. See, e.g., FIG. 1 (102); FIGS. 4-6 (102, 401); see also below discussion of elastic modulus of enamel, dentin, and fiber optic used in method.

The dental practitioner then provides 302 a fiber optic pin 501 having a length longer than the predetermined depth of the aperture 401 and a diameter smaller than that of the aperture 401. In preferred embodiments, the fiber optic pin 501 may have a diameter of between 0.3 and 1 millimeter and a length of between 5 and 10 millimeters, although sizes outside of these ranges may be used without departing from the scope and purposes of the invention. In various embodiments, the fiber optic pin 501 is only a single fiber optic strand, to be contrasted in structure and properties from larger fiber optic bundles or posts.

Significantly, for the method to be optimally effective in restoring or approximating pre-injury tooth dynamics, the fiber optic pin 501 must also have an elastic modulus similar to or only slightly varying from that of existing tooth material. More specifically, tooth enamel and dentin typically have a Young's modulus of 17 GPa and 40-42 GPa, respectively. The system preferably uses a fiber optic pin 501 with a Young's modulus of between 22 GPa and 83 GPa. This elastic modulus range is contrasted to that of, e.g., more rigid stainless steel (up to 407 GPa) or titanium (~193 GPa) pins, as well as larger diameter fiber optic, polymer, or elastomeric pins and posts.

The fiber optic pin 501 is then acid etched 303 in order to roughen and/or create more surface area for optimizing later adhesive and/or chemical bonding. Such acid etching may be performed using acid available in many common commercial dental products. The aperture 401 and/or tooth surfaces of the injury 102 may also be acid etched 304 for the same purpose, although typically using a different etchant. One or more portions of the fiber optic pin 501 is then coated and or primed 305 with a silane preparation.

Figure 7:
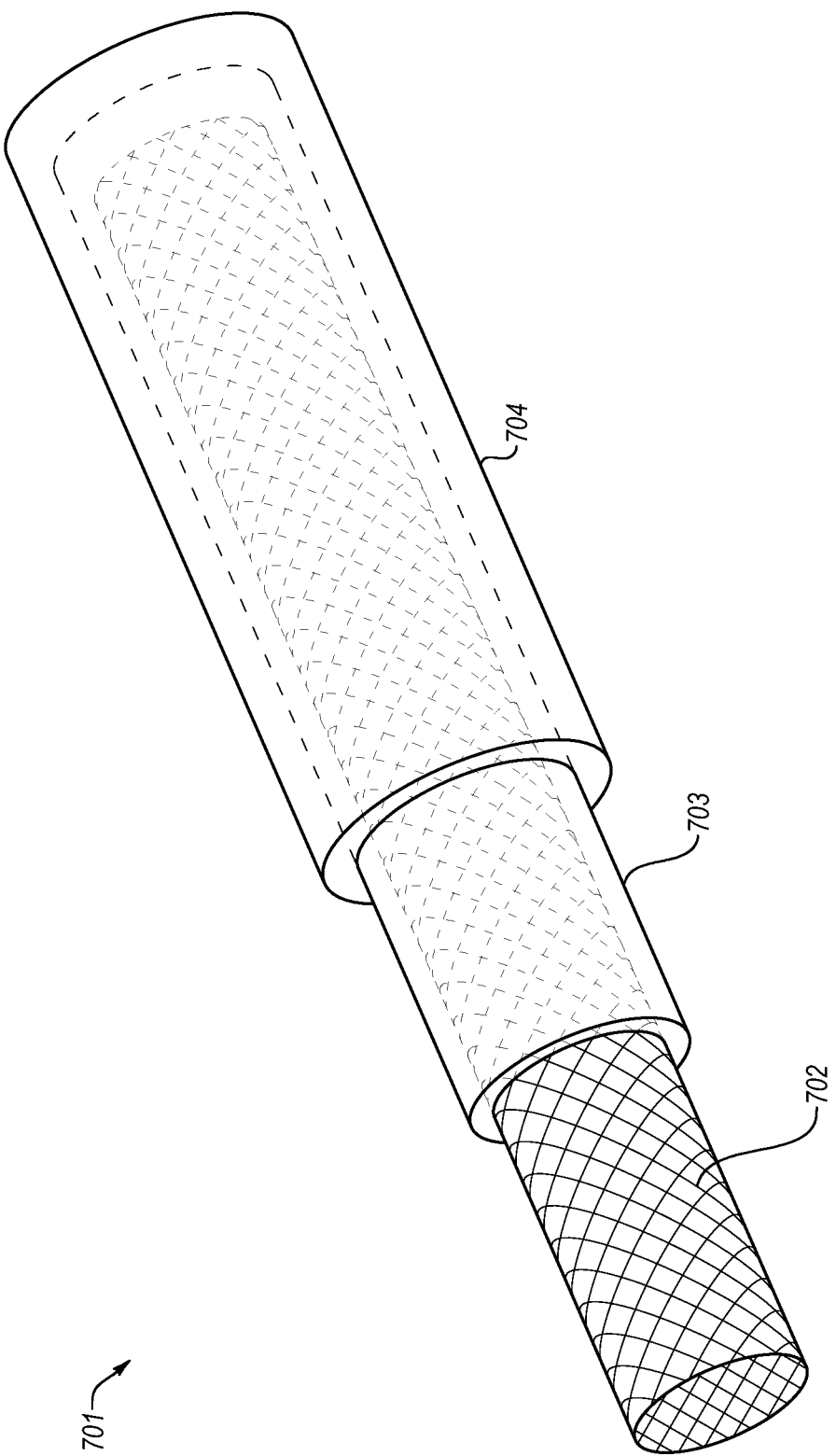
FIG. 7 is a perspective view of a tooth repair pin in one embodiment of the invention.

Referring briefly to FIG. 7, in certain embodiments of the system, fiber optic pin 701 may come pre-prepared in commercial form with one or more pre-etched 702 and/or silane coated 703 surfaces—thus omitting the need for the dental practitioner to perform the etching and/or silane coating, fiber optic pin preparation steps set forth above during a procedure. Commercial embodiments may also include a carrier sleeve 704 adjacent to one end of the pin for ease of manipulation and handling convenience during procedure. Although configurations of the carrier sleeve 704 vary without departing from the purpose and scope of the invention, the carrier sleeve 704 may be, for example, tubular or a generally planar tab.

Referring back to FIGS. 3 and 5, the fiber optic pin 501 is next adhered 306 to the injured tooth 102 in the aperture 401. In one example, a glue and/or flowable composite (not shown) is placed on the fiber optic pin 501 which is then placed in the aperture 401 with remaining length extruding from the aperture 401. The pin 501 and adhesive may then be light cured and restorative material added as a filling to the injured tooth 102 around the extruding length to comprise a restorative step 307. In a slightly different restorative step 307, light curing takes place following addition of the restorative material to the injured tooth 102. However, any number of suitable adhesive and/or restorative systems or steps may be used without departing from the scope and purposes of the invention. Regardless of the specific process used (or not used) the final result is a fiber optic that anchors a restored tooth portion to the broken tooth surface, preferably within one or more of tooth enamel and dentin.

Significantly, in most typical light curing portions of adhesive and/or restorative steps, the fiber optic pin 501 transmits the light deeply into and throughout the aperture 401 during the curing process, resulting in a stronger chemical bond than may be achieved with other materials or mechanisms. For example, whereas curing without the fiber optic may usually occur to a depth of 3 millimeters, curing depth with the fiber optic may double. Also, curing with the fiber optic may take place at various angles to the extent the fiber optic bends in angled apertures in some applications. Some applications of the system may incorporate one or more fiber optic pin scaffoldings, allowing light curing to take place across a matrix.

Thus configured, embodiments of the present invention provide a long lasting and conservative tooth repair system that generally maintains the natural directional forces and dynamics of, e.g., an anterior tooth by utilizing a flexible and narrow diameter fiber optic pin with a Young's modulus comparable to that of the existing tooth materials. The solution supplements a chemical bond with a flexible mechanical one, thereby balancing both sheer and compressional forces with respect to a longitudinal axis of the repaired tooth. Embodiments of the present invention typically yield significant cost advantages to patients in comparison to more aggressive procedures, being, e.g., up to five times less expensive than a crown procedure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method of repairing a tooth comprising the steps of:
   drilling an aperture in a broken tooth surface generally along a longitudinal axis of a tooth to a depth located within a tooth crown;
   providing a fiber optic that is only a single fiber optic strand with a length longer than the depth;
   placing and adhering the fiber optic within the aperture so that a first end of the fiber optic is located within the tooth crown and a second end of the fiber optic is exposed beyond the broken tooth surface; and
   restoring the broken tooth surface around the second end of the fiber optic so that the fiber optic anchors a restored tooth portion to the broken tooth surface and so that the fiber optic is completely located within the tooth crown and the restored tooth portion.

2. The method of claim 1, wherein the fiber optic has a diameter of between 0.3 and 1 millimeter.

3. The method of claim 1, wherein the fiber optic has a Young's modulus of between 22 GPa and 83 GPa.

4. The method of claim 1, wherein the fiber optic has a length of between 5 and 10 millimeters.

5. The method of claim 1, wherein the fiber optic is pre-acid etched.

6. A method of repairing a tooth comprising the steps of:
   drilling an aperture in a broken tooth surface to a depth of around 0.6 millimeters located within a tooth crown;
   providing a generally silane-coated fiber optic that is only a single fiber optic strand having a length longer than the depth;
   placing the fiber optic and adhesive within the aperture so that a portion of the fiber optic generally fills the aperture and another portion of the fiber optic is exposed beyond the broken tooth surface; and
   restoring the broken tooth surface around the fiber optic portion that is exposed beyond the broken tooth surface so that the fiber optic anchors a restored tooth portion to the broken tooth surface and so that the fiber optic is completely located within the tooth crown and the restored tooth portion.

7. The method of claim 6, wherein the fiber optic has a diameter of between 0.3 and 1 millimeter.

8. The method of claim 6, wherein the fiber optic has a Young's modulus of between 22 GPa and 83 GPa.

9. The method of claim 6, wherein the fiber optic has a length of between 5 and 10 millimeters.

* * * * *